Figure 1:
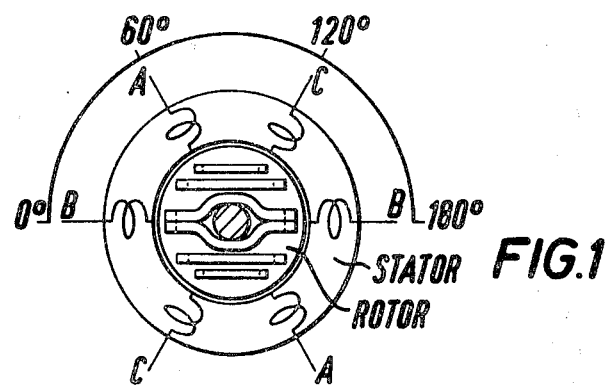

United States Patent [19]

Hore

[11] 4,177,395

[45] Dec. 4, 1979

[54] ACTUATORS

[75] Inventor: Donald L. Hore, Bath, England

[73] Assignee: Rotork Limited, Bath, England

[21] Appl. No.: 862,092

[22] Filed: Dec. 19, 1977

[51] Int. Cl.² ........................................... H02K 33/00
[52] U.S. Cl. ..................................... 310/39; 310/166
[58] Field of Search ............. 310/166, 211, 49, 36–39; 335/225, 226, 227, 272; 318/470

[56] References Cited

U.S. PATENT DOCUMENTS

| | | | |
|---|---|---|---|
| 1,653,946 | 12/1927 | Clausen | 310/49 |
| 1,863,948 | 6/1932 | Spath | 310/38 |
| 2,563,271 | 8/1951 | Price | 310/39 UX |
| 2,700,739 | 1/1955 | Orlando | 310/166 X |
| 2,767,362 | 10/1956 | Beaubien | 318/470 X |
| 3,045,160 | 7/1962 | Pickering | 310/39 X |
| 3,194,032 | 7/1965 | Von Brimer | 310/39 X |
| 3,216,226 | 11/1965 | Alger et al. | 310/39 X |

*Primary Examiner*—Donovan F. Duggan
*Attorney, Agent, or Firm*—Stevens, Davis, Miller & Mosher

[57] ABSTRACT

This invention relates to an electrically operated actuator for quarter-turn valves, such as butterfly or ball valves.

The actuator includes a single phase 2-pole dynamoelectric machine comprising a stator having three windings and a rotor having a plurality of short-circuited windings. The rotor is coupled directly with the output shaft and the windings of the stator are energised from a power supply through respective limit switches which are cam controlled by the output shaft.

One of the stator windings controls the final movement of the actuator in each direction of travel and the limit switch for this winding is broken to de-energize the winding by an adjustable stop mechanism.

15 Claims, 12 Drawing Figures

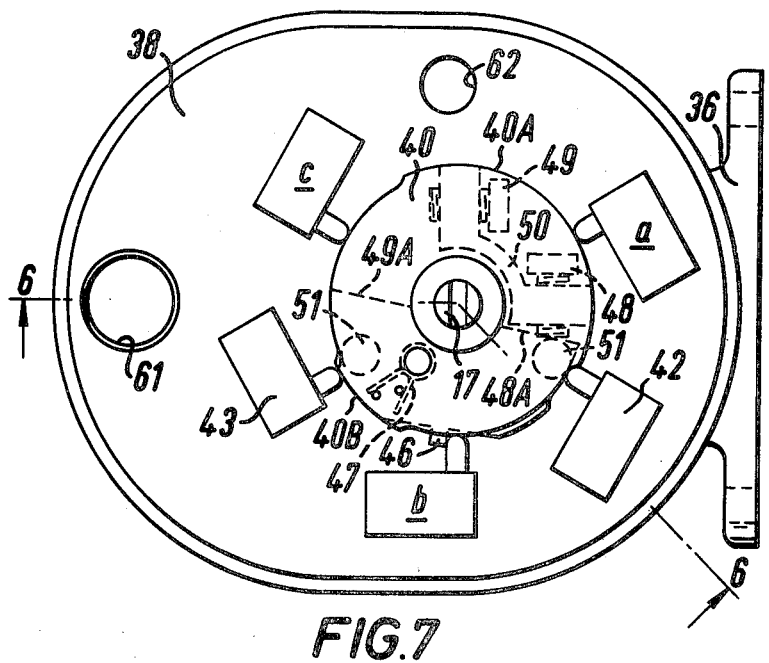
FIG.7
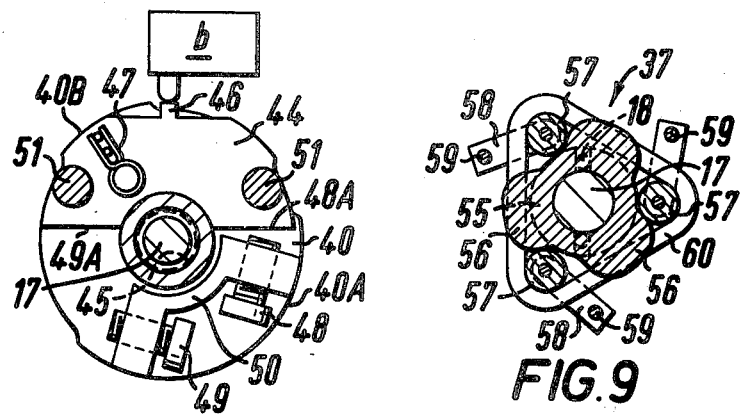
FIG.8
FIG.9

ACTUATORS

This invention relates to actuators and has for its object to provide a small self-contained apparatus which is power operated to produce a predetermined angular movement of an output member for operating a semi-rotary device to be actuated, for example a quarter-turn valve such as a butterfly or ball valve.

The actuator of the invention is electrically operated and includes a single phase, 2-pole dynamo electric machine which is of the kind described in Patent Appln. No. 573,602 and which comprises a laminated stator having slots with three windings therein, arranged to be energised to provide alternating or reversing flux, and a laminated rotor member movable with respect to the stator and having a plurality of short circuited continuous loops to which there are no external connections. The short circuited loops of the rotor member form parallel flux paths and allow alternating flux to pass through the rotor in planes parallel to the planes of the loops without linking the loops when the rotor is in a null position with respect to the stator. The inductive reactance of the stator windings varies with the displacement of the rotor relative to the stator according to the degree of linking of the rotor short circuited loops with the stator windings, so that a force is produced tending to restore the rotor to the null position in which such linkage is a minimum.

According to the invention the rotor is coupled directly to the output shaft of the actuator, and the three stator windings are connected through three respective limit switches each cam operated from said output shaft, the windings and switches being so arranged that the same one of said windings is energised to complete the travel of the actuator in each direction. Preferably the same switch corresponding to said one winding is used to disconnect said one winding at both ends of travel of the actuator.

In the preferred embodiment of the actuator mechanical stop adjustment only is required to set the actuator up on the valve. An adjustable mechanical stop is provided for each direction of travel of the actuator and adjustment of the mechanical stops automatically adjusts the end of travel limit switch to disconnect power from the said one winding just before the stop is reached.

The arrangement enables quarter-turn valves of a size and pressure rating beyond the possibilities of conventional solenoid operation to be electrically operated at up to solenoid speed and without the necessity of providing any intermediate gearing.

Figure 2:
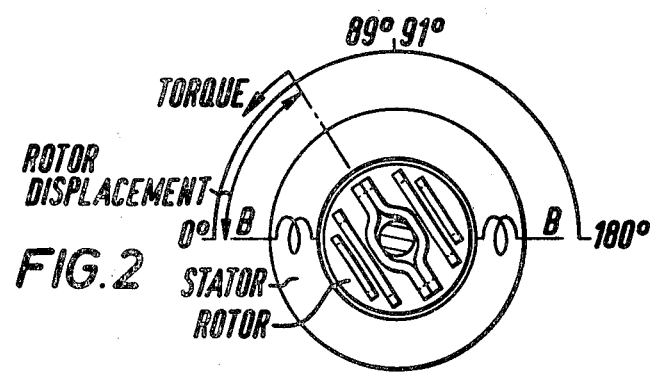
Figure 3:
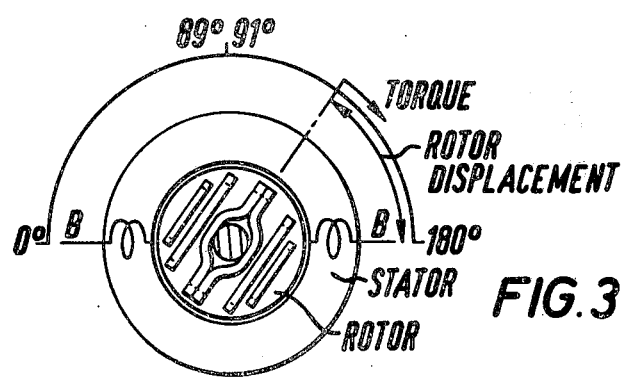
Figure 4:
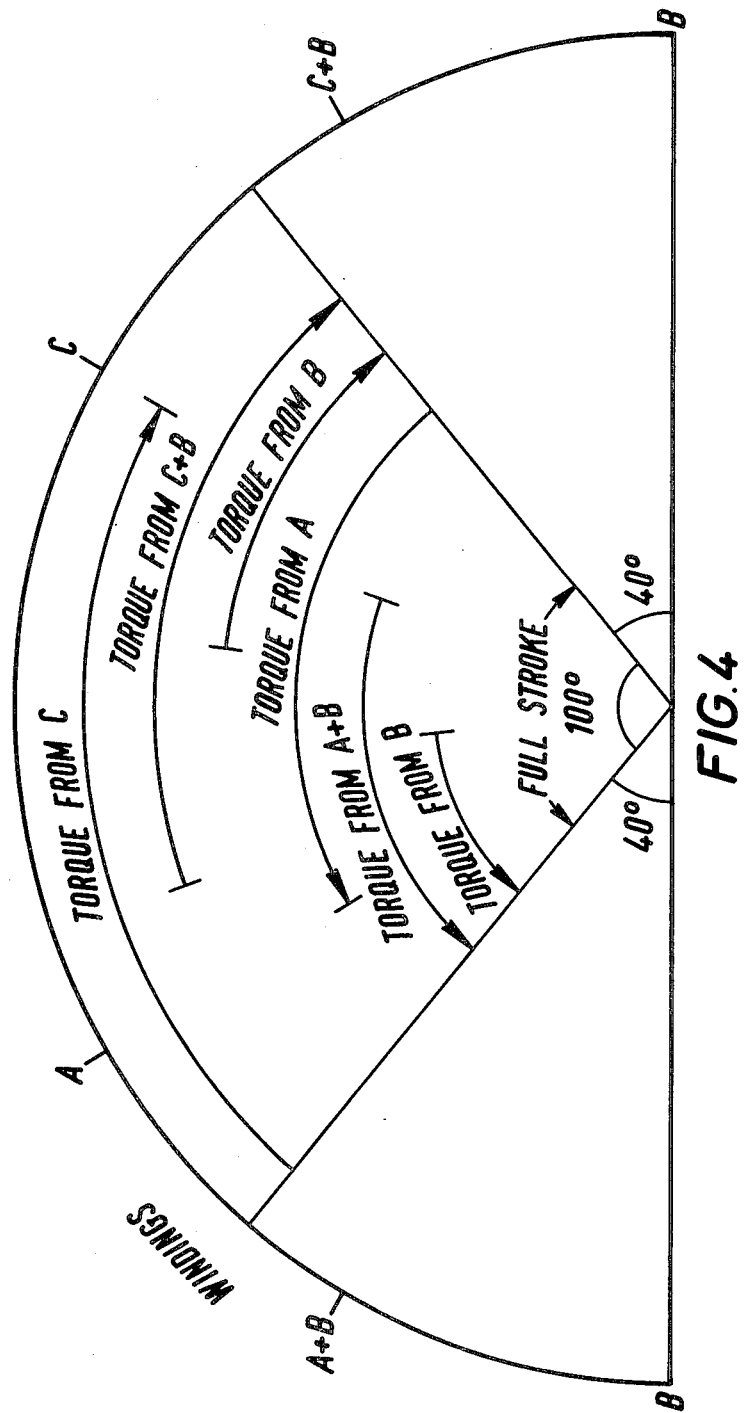
Figure 5:
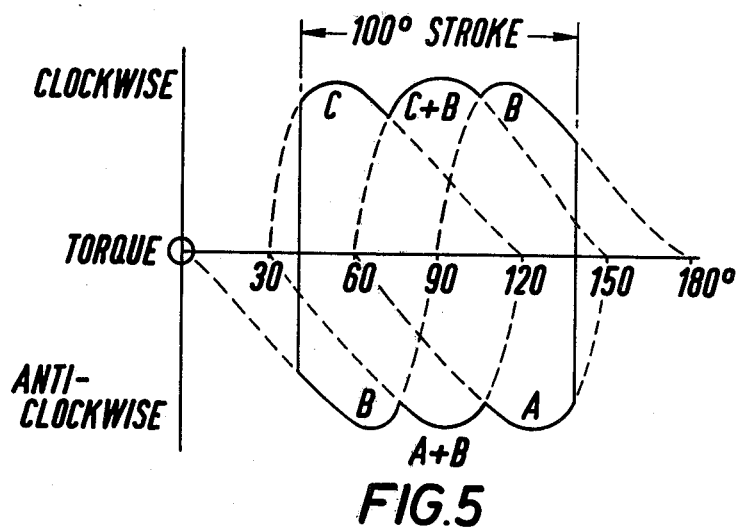
Figure 12:
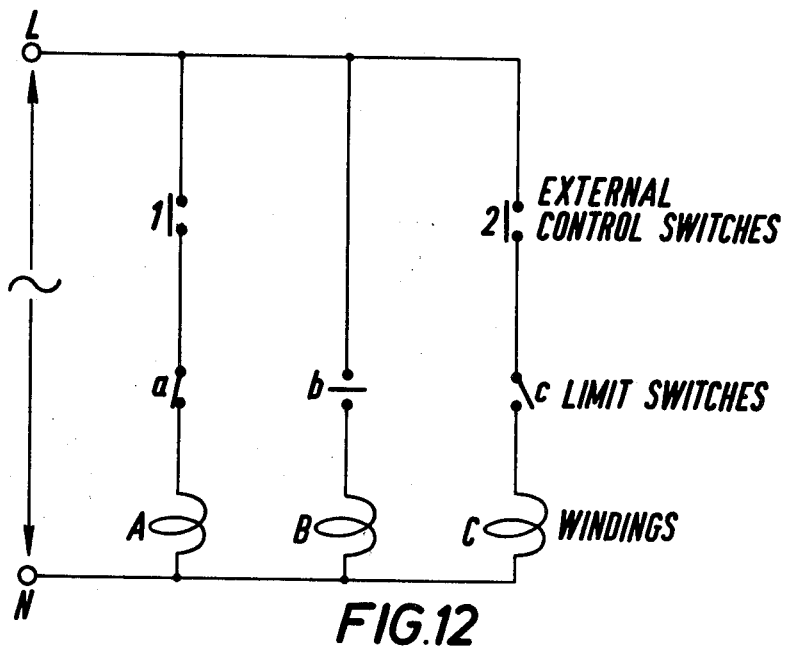
Figure 6:
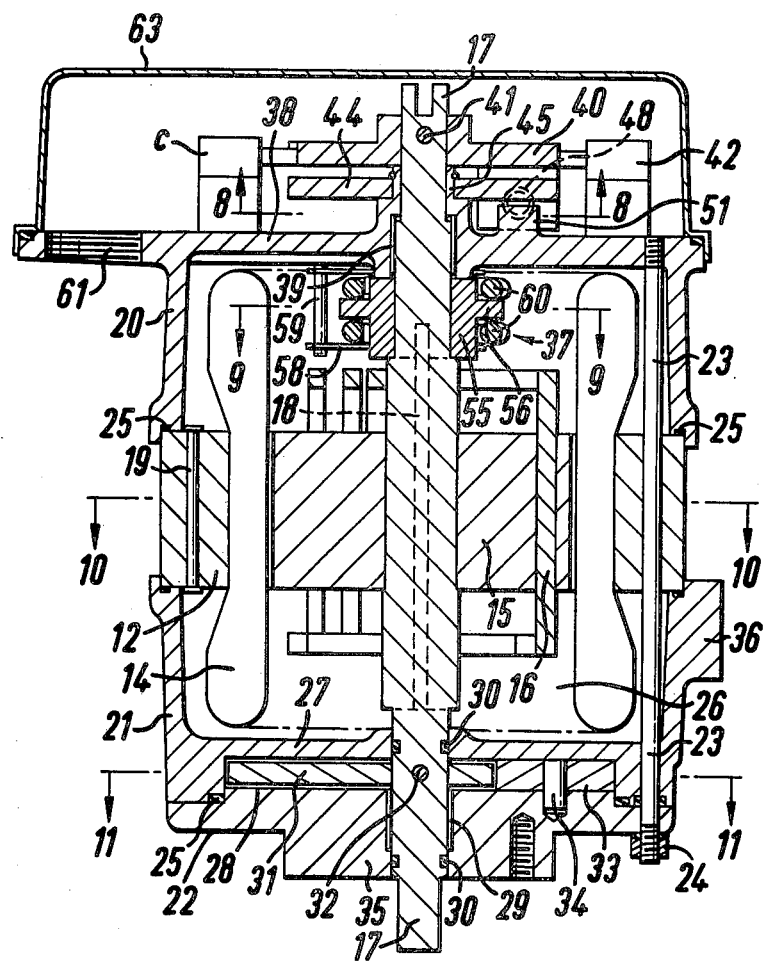
Figure 10:
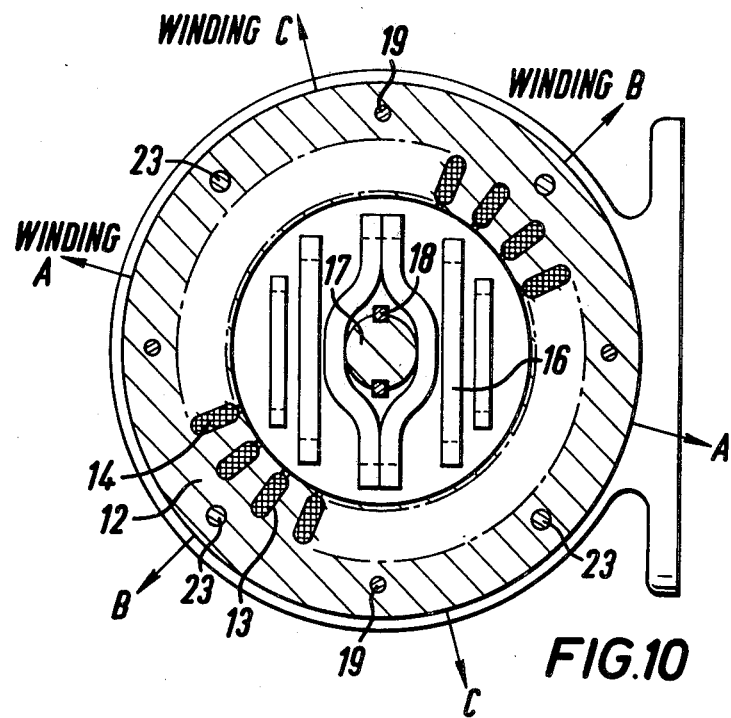
Figure 11:
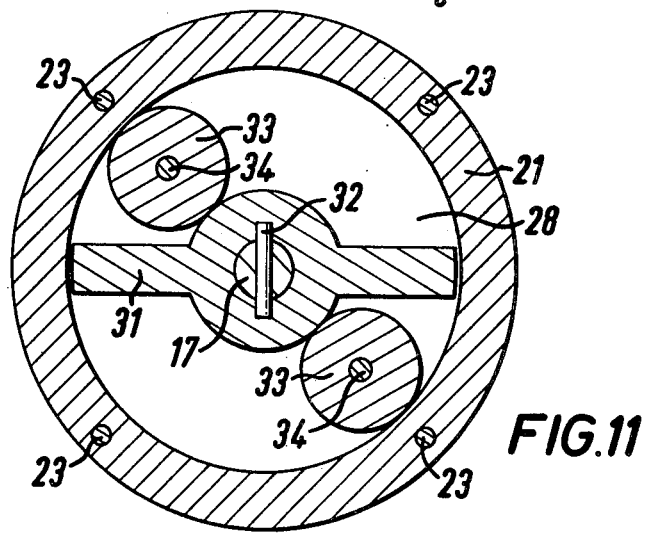

An actuator in accordance with the invention incorporating a dynamo electric machine in the form of a rotary solenoid will now be described by way of example with reference to the accompanying drawings, in which:

FIG. 1 is a diagrammatic illustration of the coils of the stator and rotor of the rotary solenoid with the rotor shown in its null position for one of the windings of the stator, FIG. 2 is a diagrammatic illustration similar to FIG. 1 showing the effect on the stator winding of displacing the rotor up to 89° clockwise from its null position, FIG. 3 is a diagrammatic illustration similar to FIG. 2 showing the effect of displacing the rotor up to 89° anti-clockwise from its null position as shown in FIG. 1, FIG. 4 is a diagrammatic illustration of the disposition of the windings of the stator in order to obtain an effective movement of 100° for the actuator, FIG. 5 is a typical torque/stroke characteristic of the actuator of the invention, FIG. 6 is a sectional elevation of the actuator of the invention incorporating the rotary solenoid, the section being taken on the line 6—6 of FIG. 7, FIG. 7 is a plan view of the actuator of FIG. 6 but with the cover plate removed, FIG. 8 is an underneath plan view of the switch plate mechanism taken on the line 8—8 of FIG. 6, FIG. 9 is a section through the detent mechanism of the actuator taken on the line 9—9 of FIG. 6, FIG. 10 is a sectional view through the rotary solenoid taken on the line 10—10 of FIG. 6, FIG. 11 is a sectional view through the damper device of the actuator taken on the line 11—11 of FIG. 6, and FIG. 12 is a basic circuit diagram for the electrical operation of the actuator of the invention.

As previously mentioned the invention is primarily concerned with the operation of quarter-turn valves by an actuator which incorporates a rotary solenoid of the kind described in Patent Appln. No. 573,602 and which consists of a single phase device having a stator provided with three 2-pole windings and a rotor having short-circuited windings so that when the windings of the stator are energised a high torque is developed as the rotor moves to adopt a position in which the linkage of the short-circuited windings with the stator windings is minimised.

The construction and principles of operation of such rotary solenoids will be described briefly hereinafter but reference should be made to Patent Appln. No. 573,602 for a more detailed description.

In the application of the actuator for the operation of quarter-turn valves although the nominal angular movement of the valve is 90° the actuator has to be capable of more than this movement so as to permit setting adjustment at each end with a margin for manufacturing tolerances in valve and actuator alignment and backlash in keys and couplings. To provide plus or minus 5° at each end of travel requires therefore a total actuator travel capability of 100°. Using a rotary solenoid having three stator windings at 60° to each other gives a total travel between zero torque positions of 120°, so that a movement of 100° can be obtained with torque available at each end in each direction.

Referring now to FIG. 1 of the drawings the stator incorporates three windings A, B and C at 60° to each other, the axes of the coils being shown diagrammatically and representing the flux axes of the actual windings. As explained in Patent Appln. No. 573,602 it will apparent that if winding B only is energised the rotor will tend to align itself horizontally, i.e. in one of two positions 180° apart. In the Figure the rotor is shown in the null position for winding B. If the rotor is in the position shown in FIG. 2, i.e. within the quadrant 0° to 89°, energising winding B will cause the rotor to turn anti-clockwise to the 0° position. If it is in the position shown in FIG. 3, i.e. in the quadrant 91° to 180°, energising winding B will cause the rotor to turn clockwise towards the 180° position. This is because the 90° position represents the cross-over or top-dead-centre position in which maximum current is induced in the rotor short-circuit windings, but the torque is zero, but a slight displacement either side of 90° will cause a high torque to be developed to restore the rotor to the null position at 0° or 180°.

The torque will be zero at 0° and 180°, but will be significant at the 40° and 140° positions. At the 40° position, the torque will be anti-clockwise, and at the 140° position clockwise. The 100° between these two positions therefore represents the desirable stroke range for a quarter-turn valve actuator in which the same winding B can be used to complete and terminate travel in both directions.

FIG. 4 shows the disposition of the windings A, B and C to obtain an effective 100° stroke for the actuator with winding B energised towards each end of travel. Considering firstly the actuator in the fully anti-clockwise position at 40°, travel commencement clockwise requires energisation of winding C, the null position for which is at 120°, i.e. 80° from the starting position and therefore one which will cause a very high clockwise torque to be developed. As the rotor moves towards the null position of winding C the torque will fall. If, however, when the rotor reaches about the 70° position winding B is also energised, the combination of windings C and B connected in the right phase sense will increase the torque because a new null position has been formed at 150°. Again the torque falls as this position is approached, so that by the time the 120° position is approached it is advantageous to disconnect winding C, leaving completion of clockwise travel under the control of winding B which is de-energised at the appropriate setting around 140°.

Starting now from the fully clockwise position at 140°, it will be apparent that the anti-clockwise sequence follows exactly the same pattern but using a winding A to start with, windings A and B for intermediate travel, and winding B only for completion of travel.

A typical torque stroke displacement characteristic is shown in FIG. 5 in which the curves above the horizontal axis represent clockwise movement, and those below the axis anti-clockwise. It will be apparent that the torque available from the windings singly or in combination can be optimized by the appropriate intermediate settings of limit switches for the windings. The point in travel at which winding B is to be energised will be different for the two directions and this is obtained by backlash in the switch mechanism as will be hereinafter explained.

The actuator of the invention incorporating the principles of operation discussed above with reference to FIGS. 1 to 5 is illustrated in its preferred form in FIGS. 6 to 11 of the drawings. In the sectional elevation through the actuator as shown in FIG. 6 the parts of the actuator are located within a cylindrical casing 10 of somewhat elongated shape.

The power unit of the actuator consists of a dynamo-electric machine in the form of a double-acting rotary solenoid indicated generally by the reference 11. The rotary solenoid is preferably of the type described and shown in Patent Specification No. 1,485,154 and in the embodiment of the actuator illustrated consists of a single phase device having a stator 12 formed with slots 13 for receiving the three 2-pole windings 14 (see FIG. 10). The rotor 15 of the solenoid device includes short-circuited windings 16 and is fixedly secured to an output shaft 17 extending longitudinally of the casing 10 by key-pins 18, so that, when the windings of the stator 12 are energised a high torque is developed as the rotor 15 moves to adopt a position in which the linkage of the short-circuited windings 16 with the energised stator windings is minimised.

The stator 12 is of laminated construction connected by rivet pins 19 and to make the actuator as compact as possible the stator is supported by and forms a part of the casing structure for the actuator. As shown in FIG. 6 the casing 10 is formed by clamping together an upper inverted cup-shaped housing member 20, the stator 12, a lower cup-shaped housing member 21 and a base plate 22 by means of studs 23 which extend upwardly through apertures in the base plate, the lower housing member and the stator to engage threadably with threaded holes in the upper housing member 20. The parts of the casing are held fixedly together by nuts 24 on the lower threaded ends of the stud 23 and the usual seals 25 are provided to ensure fluid-tightness of the casing.

The casing 10 thus provides a chamber 26 for the rotary solenoid 11 and the centrally located output shaft 17 which is shouldered to support the rotor 15 and which extends upwardly through the upper housing member 20 and downwardly through the lower housing member 21 as will now be described.

The end wall 27 of the lower housing member 21 is recessed so as to form with base plate 22 a chamber 28 for a fluid damper device for controlling the speed of operation of the actuator. The lower end of the rotary shaft 17 extends through chamber 28 and through the attached base plate 22 and projects as shown from the lower end of the casing for connection to the associated valve assembly.

The output shaft 17 is rotatably supported in a lower bearing 29 accommodated in the base plate 22 and the usual seals 30 are provided to ensure fluid-tightness of the chamber 28.

The fluid damper device is shown more clearly in FIG. 11 which is a section through the chamber 28. It will be seen that the damper comprises a double-sided vane 31 which is located in the circular chamber 28 and is connected to shaft 17 by pin 32 for rotation therewith in chamber 28 which is filled with a damping fluid such as oil of a desired viscosity. Two fixed circular baffles 33 are attached at opposite sides of the chamber by pins 34 to base plate 22. The fixed baffles 33 abut closely the hub portion of the vane 31 and thereby provide two sections in the chamber 28 each accommodating an arm of the vane 31 as the output shaft 17 is moved angularly with the rotor 15 between its end position. The oil-filled damper is incorporated because the speed of operation of the actuator may be too high for some applications, particularly where there is a possibility of hydraulic shock. The clearance around the arms of the vane 31 is arranged to give a damping effect in proportion to the viscosity of the oil located in the chamber 28. The oil can be changed to vary the damping effect. Alternatively, the oil can be arranged to by-pass the baffles 33 through two circumferential channels, which are obstructed by screws which can be adjusted externally of the casing 10. As the screws are withdrawn, the by-pass orifice is increased with a corresponding increase in the speed of operation of the actuator.

The actuator is mounted on the valve assembly (not shown) by means of a mounting flange 35 forming a lower extension of the base plate 22 and the combined actuator and valve assembly is attached to a wall or supporting bracket by a mounting foot 36 extending from the side of the lower housing 21 of the casing.

The upper end of the output shaft 17 is first stepped to support in the chamber 26 a detent mechanism 37 to be hereinafter described and then extends through the upper wall 38 of the upper housing member 20 in which it is rotatably supported by an upper bearing 39. The upper end of the shaft 17 projects above wall 38 which provides a top plate to the actuator on which is mounted a series of switches (see FIG. 7) controlling the energisation of the stator windings 14 as discussed with reference to FIGS. 1 to 5 and operable in response to the rotation of shaft 17 by rotor 15.

A cam plate 40 is attached as by pin 41 to the upper end of shaft 17 for rotation therewith and the plate is of generally circular configuration having a first elongated cam portion 40A and a second shorter cam portion 40B positioned diametrically opposite the first cam portion. The function of the cam portions on plate 40 is to operate sequentially the switches controlling the energisation of the stator windings as the rotor moves through its stroke and also to operate end position switches for indicating the position of the actuator, i.e. its valve open or closed position.

Referring to FIG. 7 the limit switches for each stator winding A, B and C are shown respectively as a, b and c, these limit switches being spaced angularly at 120° about the axis of rotation of plate 40 and secured as shown in FIG. 6 to the top plate 38 of the upper housing member 20. Positioned between switches a and b is an open end position indicator switch 42 and between switches c and b a closed end position indicator switch 43, both end position switches also being mounted on plate 38.

The common winding to complete the travel of the actuator in each direction is the winding B controlled by the limit switch b. The switch b must therefore be made to energise winding B at different angular positions of the rotor 15 depending on the direction of travel of the actuator and must also operate in each direction as a cut-off switch for the actuator.

These functions for switch b are obtained by providing a second cam plate 44 below the cam plate 40 and which is freely rotatable about a hub portion 45 projecting upwardly from plate 38 and supporting shaft 17 below plate 44. The shape of the cam plate 44 is shown more clearly in the underneath plan view of FIG. 8 and it will be seen that it extends over about half the area of plate 40 adjacent the switch b and has a projecting finger 46 which holds switch b made for energising the winding B when the plate is in its central position as shown in FIG. 8, to which position it is urged by a spring device 47 comprising a pair of resilient spring arms located one on each side of a pair of pins, one of which is connected to the underside of plate 44, and the other to top plate 38 of the casing. The lower cam plate 44 therefore has only limited movement from its central position and such movement from its central position is obtained by an adjustable stop mechanism carried by the upper cam plate 40.

The adjustable stop mechanism comprises two stop screws 48 and 49 threadably mounted for adjustment in a ledge 50 projecting downwardly from the undersurface of top cam plate 40. The arrangement is shown more clearly in FIG. 8 and as the top plate 40 is rotated in one or other angular direction one of the stop screws will engage the corresponding edge surface 48A or 49A of the bottom cam plate 44. This position is reached at the end of the 90° stroke of the actuator and further rotation of the top cam plate 40 then rotates bottom cam plate 44 to break switch b and thereby de-energise the stator winding B to stop the actuator. The desired cut-off position in each direction of travel is obtained by adjustment of the stop screw 48 or 49 and a mechanical stop is provided in each direction of travel by end stop pins 51 which project upwardly from top plate 38 at positions which allow approximately 100° of movement for the top cam plate 40 between its end positions. A basic circuit diagram for the electrical control of the actuator is shown in FIG. 6. The single phase supply is connected across each stator winding A, B and C. Each winding has its limit switch a, b and c connected in series and windings A and C each additionally have an external control switch 1 and 2 respectively connected in series for energising the actuator.

In the operation of the actuator as now described the actuator as seen in FIG. 7 is in its valve closed position in that the closed end position indicator switch 43 is made. In this position stop screw 48 is against its mechanical stop pin 51, switch b is de-energised and switch a has been made by cam portion 40A as the actuator moved to its closed position. This is the position shown also in FIG. 6 and to open the valve the operator depresses external switch 1 to energise stator winding A. The rotor thereby rotates (anti-clockwise in FIG. 7) and as the top cam plate 40 rotates with the rotor its shorter cam portion 40B rides up the plunger of switch b to energise the switch which is then held made by the interlock between the cam plates as the cam plate 44 is now able to move to its central position and so holds switch b made by its finger 46 as the top plate continues to rotate. As plate 40 continues its rotation it now de-energises stator winding A as switch a is broken as cam portion 48A rotates and this cam portion then makes switch c ready for the reverse movement to close the valve.

Further rotation of the cam plate 40 engages stop screw 49 with the edge of the lower plate 44 which is then moved from its central position in the anti-clockwise direction to break switch b to de-energise stator winding B and so stop the actuator. At this time stop screw 49 has approached its mechanical stop pin 51 and the shorter cam portion 40B trips switch 42 to indicate to the operator that the actuator has reached its open position.

In order to move the actuator to its closed position the operator now reverses the operation by depressing switch 2 to energise the winding C.

The actuator is completed by the detent mechanism 37 which is located below plate 38 in the annular space between the top of the stator winding 14 in chamber 46. The mechanism is shown also in the sectional view of FIG. 9 and it comprises a cam member 55 supported on the stepped portion of shaft 17 and rotatable with shaft 17, the cam member being keyed to the shaft by an upward extension of the pins 18. The cam member has three lobes 56 formed thereon and disposed at 120° to each other as shown in FIG. 9 and which in the mid-travel of the actuator cause maximum deflection to three rollers 57. The rollers are carried by plates 58 pivoted at 59 to the undersurface of plate 38, and are constrained to move radially inwardly by a pair of surrounding tension spring loops 60 (see FIG. 6). In any position other than the mid-travel of the actuator the spring tension of the loops 60 develops a torque on the cam 55 tending to move the actuator towards one or other end stop in the absence of electrical energy. The detent mechanism 37 is particularly useful for use with valves which are not inherently stiff enough to hold themselves in the required end position, i.e. butterfly valve.

As shown in FIGS. 6 and 7 of the drawings the top plate 38 is of elongated shape projecting sideways from the main body of the casing at the opposite side of the casing from the mounting foot 36. The projecting part of the top plate 38 is provided with a cable entry 61 for the electrical leads which are suitably connected to the limit switches mounted on the top plate 38 and the electrical connections with the windings of the rotary solenoid are made by leads which pass through an aperture 62 in the top plate 38.

The actuator is completed by a terminal cover 63 which is clamped by screws to the top plate 38 of the upper housing member 20.

It will be appreciated that the invention provides a compact self-contained high speed actuator which is particularly suitable for operating quarter-turn valves by reason of the rotary solenoid provided for the power operation of the output shaft. The arrangement enables valves of a size and pressure rating beyond the normal possibilities of conventional solenoid operation to be electrically operated and up to solenoid speed. The arrangement has the advantages of normal electrical motor operation in that the actuator is de-energised while stationary so that there is no continuous current drain. The arrangement is achieved directly without utilising gearing. Because the solenoid is de-energised at the extremities of its travel positive means including springs are provided to maintain a detent torque against the end stops to prevent the de-energised output shaft moving away from the stops due for example to vibration.

I claim:

1. An electrically operated quarter-turn actuator incorporating a single phase 2-pole dynamo-electric machine comprising a laminated stator having slots with three windings therein arranged to be energised to provide alternating or reversing flux, and a laminated rotor movable with respect to the stator and having a plurality of short-circuited continuous loops to which there are no external connections, wherein the rotor is coupled directly to the output shaft of the actuator, and the three stator windings are each connected with the power supply through a respective limit switch, the limit switches being cam operated from the output shaft, and the windings and switches being so arranged that the same one only of said windings is energised to complete the travel of the rotor in each direction of movement.

2. An actuator as claimed in claim 1, wherein the same limit switch corresponding to said one winding is used also to disconnect said one winding from the power supply at both ends of travel of the actuator.

3. An actuator as claimed in claim 2, wherein travel of the actuator in a first direction is initiated by energisation of a second winding of said actuator, followed by energisation of said one winding so that the actuator moves under the combined effect of said windings, followed by disconnection of said second winding so that the final travel of the actuator in its first direction is completed only with said one winding energised.

4. An actuator as claimed in claim 3, wherein travel of the actuator in the opposite direction is initiated by energisation of the third winding of said actuator, followed by energisation of said one winding so that the actuator moves under the combined effect of said windings, followed by disconnection of said third winding so that the final travel of the actuator in said opposite direction is completed also only with said one winding energised.

5. An actuator as claimed in claim 4, wherein the limit switches controlling energisation of said windings are operated by cams on a switch plate rotatable with said output shaft and the rotor of said dynamo-electric machine, said switch plate having a first cam portion operating the limit switches corresponding to said second and third windings, and a second cam portion operating the limit switch corresponding to said one winding.

6. An actuator as claimed in claim 5, wherein said second cam portion operates also end position indicator switches.

7. An actuator as claimed in claim 6 wherein said second cam portion is operable to make the limit switch corresponding to said one winding in each direction of travel to energize said winding, said switch being maintained subsequently in its made position by a second cam plate which is operable at the end of travel of the actuator to break said switch to disconnect the power supply from said one winding.

8. An actuator as claimed in claim 5, wherein said second cam portion is operable to make the limit switch corresponding to said one winding in each direction of travel to energise said winding, said switch being maintained subsequently in its made position by a second cam plate which is operable at the end of travel of the actuator to break said switch to disconnect the power supply from said one winding.

9. An actuator as claimed in claim 8, wherein the second cam plate has a projecting finger for engaging said limit switch corresponding to said one winding, said second cam plate being resiliently urged to a central position in which said finger is in engagement with said switch with said switch made, and said finger abutting the sides of said switch when said second cam plate is displaced from its central position so as to prevent movement of said second cam plate to its central position until the second cam portion of said switch plate makes said switch.

10. An actuator as claimed in claim 9, wherein said switch plate carries adjustable stop means for engaging said second cam plate in each direction of travel to move said second cam plate from its central position through a predetermined distance to break said switch corresponding to said one winding so as to disconnect said winding from the power supply.

11. An actuator as claimed in claim 10, wherein said adjustable stop means are each adapted to engage mechanical stops fixedly mounted on the casing of the actuator.

12. An actuator as claimed in claim 11, wherein adjustment of the mechanical stops automatically adjusts the end of travel switch corresponding to said one winding to disconnect the power supply just before the mechanical stops are reached.

13. An actuator as claimed in claim 1 having a fluid-filled damper comprising two fixed baffles mounted in a chamber in the casing of the actuator and between which move vanes keyed to the output shaft to give a damping effect in proportion to the viscosity of the fluid in said chamber and the clearance around the vane.

14. An actuator as claimed in claim 13, in which external adjustment of the damper is provided by by-pass channels obstructed by screws which can be adjustably withdrawn to increase the by-pass orifice and correspondingly increase the speed of operation of the actuator.

15. An actuator as claimed in claim 1 incorporating a spring-loaded detent mechanism which acts to retain the output shaft in either end position of travel when the stator of the actuator is de-energised.

* * * * *